United States Patent
Petrou et al.

(10) Patent No.: US 7,958,128 B2
(45) Date of Patent: *Jun. 7, 2011

(54) QUERY-INDEPENDENT ENTITY IMPORTANCE IN BOOKS

(75) Inventors: David Petrou, Brooklyn, NY (US); Chiu-Ki Chan, Sunnyvale, CA (US); Daniel Loreto, New York, NY (US); Jeffrey C. Reynar, New York, NY (US); Nikola Jevtic, Newark, NJ (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/837,206

(22) Filed: Jul. 15, 2010

(65) Prior Publication Data

US 2010/0281034 A1   Nov. 4, 2010

Related U.S. Application Data

(63) Continuation of application No. 11/610,446, filed on Dec. 13, 2006, now Pat. No. 7,783,644.

(51) Int. Cl.
*G06F 17/30* (2006.01)
(52) U.S. Cl. ........ 707/748
(58) Field of Classification Search ........ 707/748
See application file for complete search history.

(56) References Cited

U.S. PATENT DOCUMENTS

| | | | | |
|---|---|---|---|---|
| 5,772,441 A * | 6/1998 | Wilson | 434/236 |
| 5,862,259 A * | 1/1999 | Bokser et al. | 382/228 |
| 5,893,093 A * | 4/1999 | Wills | 1/1 |
| 5,948,040 A * | 9/1999 | DeLorme et al. | 701/201 |
| 5,960,383 A * | 9/1999 | Fleischer | 704/9 |
| 6,263,335 B1 * | 7/2001 | Paik et al. | 1/1 |
| 6,816,858 B1 * | 11/2004 | Coden et al. | 707/750 |
| 6,847,972 B1 * | 1/2005 | Vernau et al. | 1/1 |
| 2002/0156779 A1 * | 10/2002 | Elliott et al. | 707/6 |
| 2004/0236730 A1 * | 11/2004 | Frank | 707/3 |
| 2006/0277481 A1 * | 12/2006 | Forstall et al. | 715/764 |
| 2007/0118518 A1 * | 5/2007 | Wu et al. | 707/5 |
| 2007/0150513 A1 * | 6/2007 | Vanden Heuvel et al. | 707/104.1 |
| 2008/0134033 A1 * | 6/2008 | Burns et al. | 715/705 |
| 2008/0140607 A1 * | 6/2008 | Chi et al. | 707/2 |

* cited by examiner

*Primary Examiner* — James Trujillo
*Assistant Examiner* — Jorge A Casanova
(74) *Attorney, Agent, or Firm* — Fenwick & West LLP (57) ABSTRACT

A corpus contains information including text from books and metadata about the books. The book texts mention entities of various types, such as location, date, event, and person entities. An entity importance engine analyzes the information in the corpus to identify the entities mentioned therein, and ranks the entities using query-independent importance scores. The importance scores can be based in part on the contexts in which the entities are mentioned by the books. A presentation engine enables searching of the corpus to identify books satisfying a search query. The presentation engine presents information about a designated book. Entities mentioned in the book are presented in a style selected to enhance comprehension and utility. For example, location entities can be presented on a map with markers showing the locations of the entities. The number of entities presented are limited and ordered based on the query-independent importance scores.

19 Claims, 6 Drawing Sheets

QUERY-INDEPENDENT ENTITY IMPORTANCE IN BOOKS

CROSS-REFERENCE TO RELATED APPLICATIONS

This application is a continuation of prior application Ser. No. 11/610,446, filed Dec. 13, 2006, which is incorporated herein by reference.

BACKGROUND OF THE INVENTION

1. Field of the Invention

This invention pertains to evaluating the relative importance of entities mentioned by data sources such as books.

2. Description of the Related Art

Modern information storage and retrieval systems contain a great deal of information. For example, many books, magazines, and other documents have been converted into computer-readable formats and stored in such systems. With the advent of search engines and related tools, it has become possible to structure and extract information from the documents. For example, an automated tool can analyze the text of a book to identify entities such as locations, dates, and people mentioned within it. The results of these analyses are presented to users to assist them in comprehending the information contained in the book.

It is generally acknowledged that certain types of information are easier to comprehend when presented in certain formats. For example, geographic locations are often easier to understand when identified by markers on a map. Similarly, dates are often more understandable when presented on a linear graph such as timeline. Other types of information, such as facts about a person, are often best understood when presented as text or in tabular form.

There are frequently limits on the amount of information that can be simultaneously displayed in a given format. A map might become incomprehensible if it includes so many markers that the map itself is obscured. Likewise, a timeline showing too many dates appears cluttered. It is usually desirable, therefore, to limit the amount of information presented at once in order to maintain its comprehensibility and improve its utility.

One way to limit the information is via rankings. This technique is employed, for example, by search engines that return results matching a search query. Although there might be millions of results matching the query, the search engine ranks the results and allows the searcher to traverse the results in the ranked order. An effective ranking also increases the likelihood that the searcher will quickly find the sought information. Similarly, an effective ranking increases the usefulness of information presented during general browsing (i.e., when a user is not searching for specific information).

A major difficulty is determining how to rank the information, especially in a query-independent manner. Some documents do not provide explicit guidance on how to rank the information they contain. A book, for example, might mention 500 different geographic locations, but contain no explicit guidance on how to rank these locations. As a result, it is hard to determine which information to present on a given display. Accordingly, there is a need for a way to determine the relative importance of information contained within books and other documents.

SUMMARY OF THE INVENTION

Systems and computer program products for presenting entities mentioned in books consistent with embodiments of the present invention comprise an entity importance engine that assigns query-independent importance scores to entities mentioned by books in a corpus. The embodiments also comprise a presentation engine for selecting entities mentioned by a designated book responsive to the entities' importance scores, and presenting the selected entities in a style that enhances comprehension of the entities.

A method of determining an importance score for an entity mentioned in a book consistent with embodiments of the present invention comprises assigning importance values to sections of the book and identifying one or more sections of the book that mention the entity. The method further calculates the importance score for the entity responsive at least in part to the importance values of the one or more sections of the book that mention the entity. The importance score indicates an importance of the entity relative to other entities mentioned in the book.

A method of determining an importance score for an entity mentioned in a book consistent with embodiments of the present invention comprises assigning query-independent importance scores to the entities mentioned in the book, selecting a subset of the plurality of entities responsive to the entities' importance scores, and presenting the selected subset of entities to a user in a style that enhances comprehension of the entities.

BRIEF DESCRIPTION OF THE DRAWINGS

FIG. 5 illustrates a sample web page presenting information about the book "Around the World in 80 Days."

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
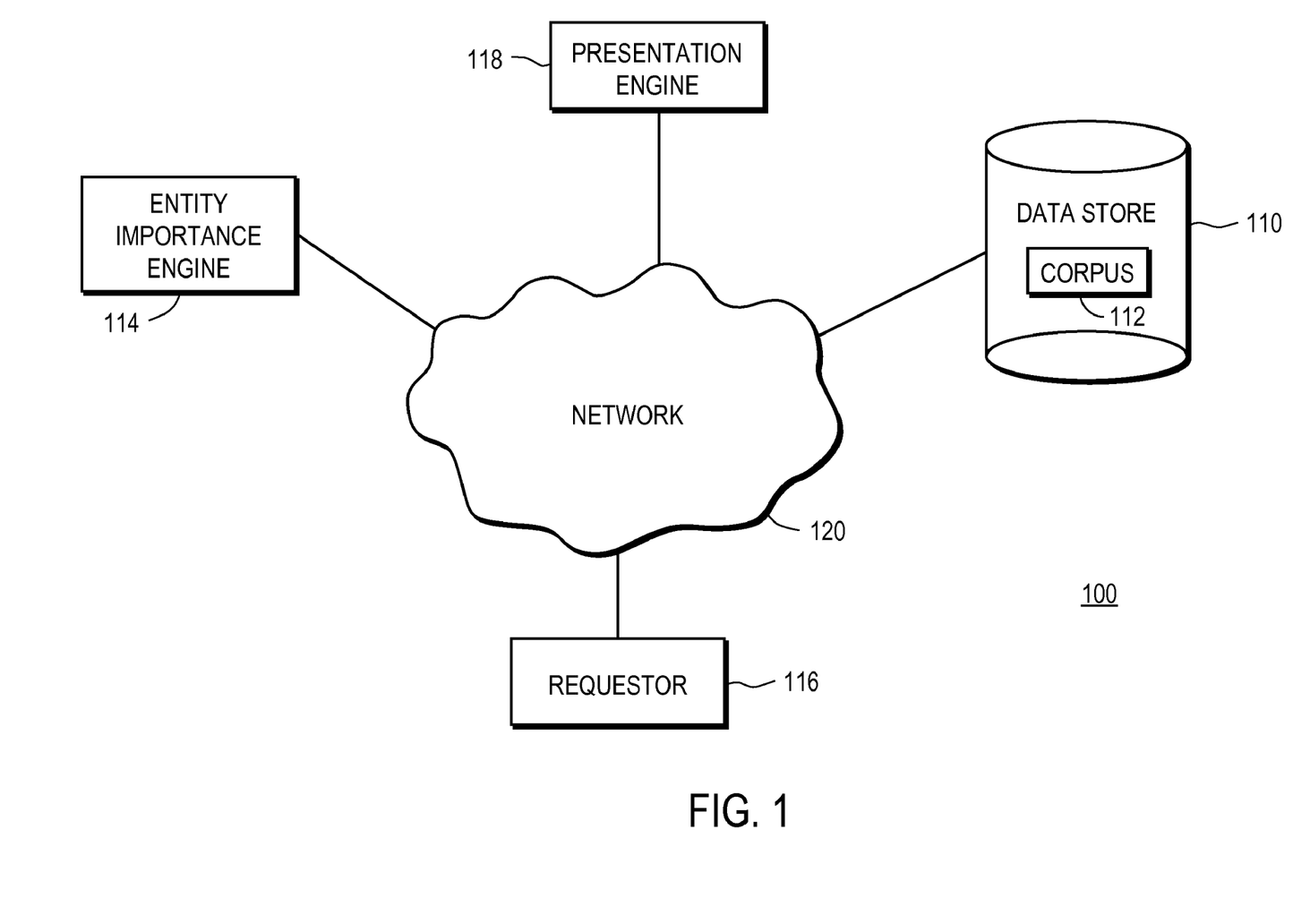
FIG. 1 shows an environment adapted to support query-independent entity importance according to one embodiment of the invention.

FIG. 1 shows an environment 100 adapted to support query-independent entity importance according to one embodiment of the invention. The environment 100 includes a data store 110 storing a corpus 112 of information mentioning entities, and an entity importance engine 114 for calculating query-independent entity importance scores and rankings for the entities. The environment also includes a requestor 116 for requesting and/or viewing information and entities from the corpus, and a presentation engine 118 for interacting with the requestor 116 and providing presentations of the entities based at least in part on the rankings. A network 120 enables communications between and among the data store 110, data processing engine 114, requestor 116, and presentation engine 118. Different embodiments of the environment 100 include different and/or additional entities than the ones shown in FIG. 1. Moreover, different embodiments are organized in a different manner. For example, in one embodiment the data store 110, entity importance engine 114, and presentation engine 118 are integrated.

The data store 110 stores one or more corpora 112 of information. The data store 110 receives requests for information in a corpus 112 and provides the information in return. The data store 110 also stores additional data utilized to support the functionality described herein, such as data utilized by the entity importance engine 114. In a typical embodiment, the data store 110 is comprised of multiple computers and/or storage devices configured to collectively store a large amount of information.

The corpus 112 stores a set of information. In one embodiment, the corpus 112 stores the contents of a large number of books. As used herein, the term "book" refers to a written work or composition. This definition includes traditional books, and collections of text not necessarily thought of as "books." For example, as used herein "books" include conventional books such as published novels, school textbooks, and cookbooks, and non-traditional books such as newspapers, magazines, journals, pamphlets, web pages and other electronic documents, and the like. The book contents stored by the corpus include, for example, the book text represented in a computer-readable format, images from the books, scanned images of pages from the books, front and back cover text and images, etc.

In addition, the corpus 112 stores metadata about the books within it. The metadata are structured data that describe the books. Examples of metadata include metadata about a book such as the author, publisher, year published, number of pages, and edition, and metadata about book contents such as optical character recognition (OCR) confidence scores that represent the confidence that the computer-readable representation of the book text is accurate and location information describing the location of given text in the book (e.g., front or back cover, front jacket inside, table of contents, page number, footnote). Other examples of book metadata include classification metadata such as a Dewey Decimal Classification, a Library of Congress Classification, an International Standard Book Number (ISBN), Book Industry Standards and Communications (BISAC) subject codes, markup language tags describing the category to which the book belongs and/or the subjects of the book (e.g., <travel>). Still other examples of book metadata include the content of or references to reviews of the books, sales information, references to other books contained within a given book, and references within a book to other content within the same book. Some embodiments have additional and/or different metadata than the types described here.

A book in the corpus 112 describes zero or more entities. An "entity" is a thing having a property that is described by information in the book. Thus, an entity can be a geographic location (also referred to as a "geopoint") having a name (e.g., "Shanghai") and a location (31.40N, 121.50E), a date and/or time (e.g., 4:00 PM on 29 Nov. 2006), a time/date range (e.g., November 2006), or an event (described in one embodiment as a time and location). In addition, an "entity" can include a collection of facts describing a person, place, or thing. For example, an entity representing the country "China" has a collection of facts about China, such as a fact stating that China has a population of 1.3 billion people.

In a real world example, the novel "Around the World in Eighty Days" by Jules Verne describes entities such as the fictional characters Phileas Fogg and his loyal valet Passepartout, and locations including Shanghai, Dublin, and Calcutta. In another example, a guide to a city describes entities including restaurants, hotels, and points of interest, and also describes the location of each. In still another example, a non-fiction book describing a historical event such as the U.S. Civil War describes entities including major battles, the locations of the battles, the dates on which the battles occurred, and the people involved in the battles.

The entity importance engine 114 uses one or more computers adapted to process the information in the corpus 112 to generate query-independent importance scores for entities described therein. For example, the entity importance engine 114 processes the information in the corpus 112 describing the book "Around the World in Eighty Days" to generate query-independent importance scores for the entities Phileas Fogg, Passerpartout, Shanghai, Dublin, and Calcutta. In one embodiment, the entity importance engine 114 also produces rankings based on the importance scores.

The requestor 116 interacts with the presentation engine 118 to access and obtain information from the corpus 112. In one embodiment, the requestor 116 issues queries to the presentation engine 118 and receives in return references to books and/or other information in the corpus 112 that satisfy the query. Through additional interactions, the requestor 116 can designate one (or more) of the referenced books and review information about the book and the entities described therein.

In one embodiment, the requestor 116 is a network client utilized by a human user. The client is an electronic device having networking functionality and can be, for example, a notebook, desktop, or handheld computer, mobile telephone, personal digital assistant (PDA), mobile email device, portable game player, portable music player, computer integrated into a vehicle, etc. The client includes a web browser for interacting with the presentation engine 118 via the network 120. In some embodiments, the requestor 116 is not directly used by a human user. For example, the requestor 116 can be part of an automated process that makes requests of the presentation engine 118 for searching, testing, or data mining purposes.

The presentation engine 118 interacts with the requestor 116 to provide information from the corpus 112. In one embodiment, the presentation engine 118 includes a web server that communicates with the requestor's 116 web browser to present and receive information. In one embodiment, the presentation engine 118 receives a query from the requestor 116 and executes the query against the corpus 112 to identify one or more books, entities, and/or other information that satisfy the query. The presentation engine 118 allows the requestor to select 116 a book and obtain additional information about the book.

In one embodiment, the additional information includes a presentation that describes entities mentioned in the book. The presentation engine 118 uses the query-independent entity importance scores and rankings calculated by the entity importance engine 114 to select the entities to present. The presentation engine 118 presents the entities in a manner designed to facilitate comprehension and utility of the entity type. For example, an embodiment of the data processing engine 114 generates a map showing most important location entities mentioned in "Around the World in Eighty Days."

The network 120 represents communication pathways between the data store 110, entity importance engine 114, requestor 116, and presentation engine 118. In one embodiment, the network 120 is the Internet. The network 120 can also utilize dedicated or private communications links that are not necessarily part of the Internet. In one embodiment, the network 120 uses standard communications technologies, protocols, and/or interprocess communications techniques. Thus, the network 110 can include links using technologies such as Ethernet, 802.11, integrated services digital network (ISDN), digital subscriber line (DSL), asynchronous transfer mode (ATM), etc. Similarly, the networking protocols used on the network 110 can include the transmission control protocol/Internet protocol (TCP/IP), the hypertext transport protocol (HTTP), the simple mail transfer protocol (SMTP), the file transfer protocol (FTP), the short message service (SMS) protocol, etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), HTTP over SSL (HTTPS), and/or virtual private networks (VPNs). In another embodiment, the nodes can use custom and/or dedicated data communications technologies instead of, or in addition to, the ones described above.

Figure 2:
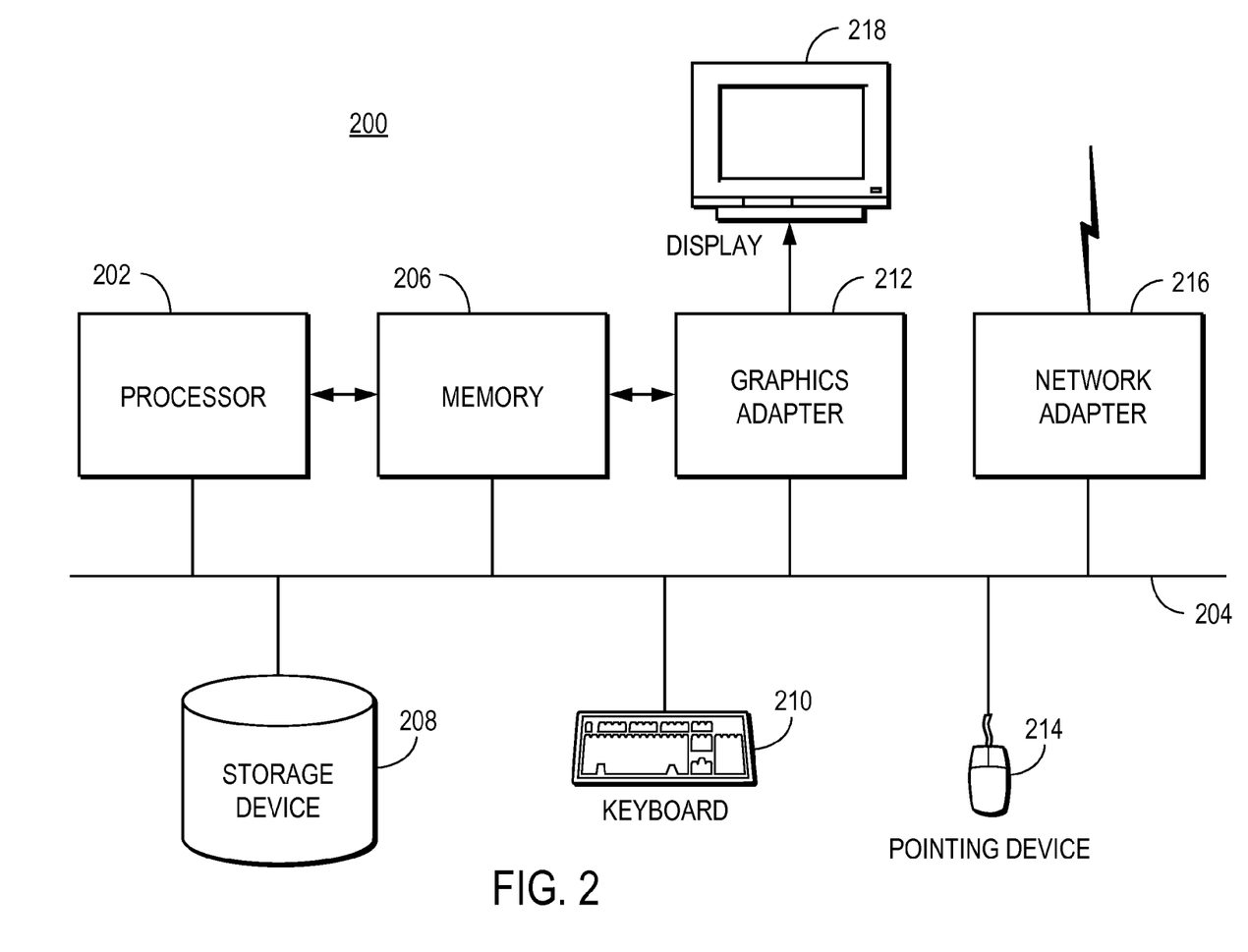
FIG. 2 is a high-level block diagram illustrating a functional view of a typical computer for use as one of the entities illustrated in the environment of FIG. 1 according to one embodiment.

FIG. 2 is a high-level block diagram illustrating a functional view of a typical computer 200 for use as one or more of the entities illustrated in the environment 100 of FIG. 1 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202 as one or more processes.

The types of computers used by the entities of FIG. 1 can vary depending upon the embodiment and the processing power utilized by the entity. For example, the requestor 116 typically requires less processing power than the entity importance engine 114 and presentation engine 118. Thus, the requestor 116 system can be a standard personal computer or a mobile telephone. The entity importance 114 and presentation engines 118, in contrast, may comprise processes executing on more powerful computers and/or multiple computers working together to provide the functionality described herein. Further, the engines 114, 118 might lack devices that are not required to operate them, such as displays 218, keyboards 210, and pointing devices 214.

Figure 3:
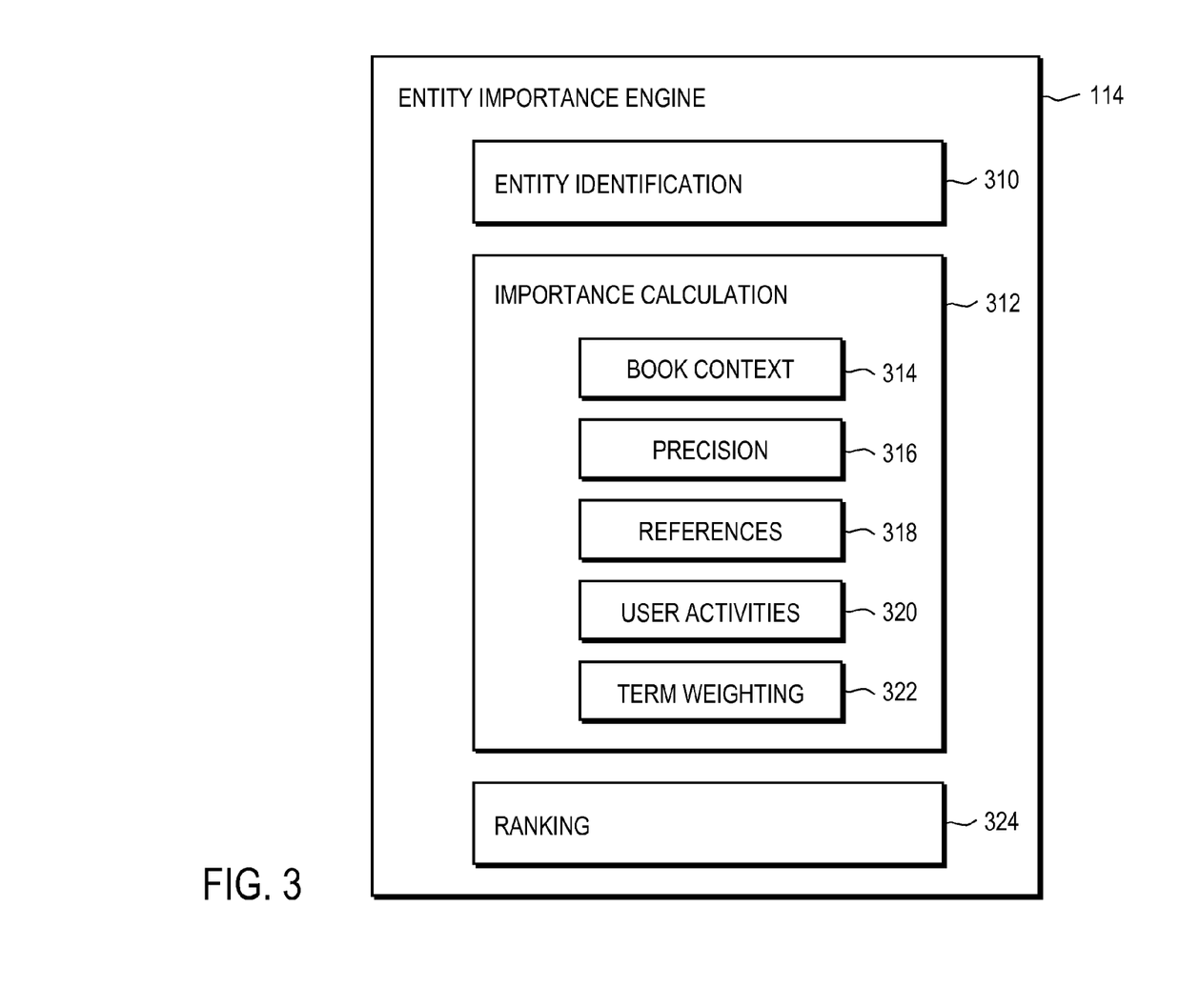
FIG. 3 is a high-level block diagram illustrating modules within the entity importance engine according to one embodiment.

FIG. 3 is a high-level block diagram illustrating modules within the entity importance engine 114 according to one embodiment. As mentioned above, an embodiment of the entity importance engine 114 generates query-independent importance scores and rankings for entities mentioned in books in the corpus 112. Some embodiments have different and/or additional modules than those shown in FIG. 3. Moreover, the functionalities can be distributed among the modules in a different manner than described here.

As the entity importance scores are query-independent, the importance scores and rankings can be determined asynchronously of any queries made against the corpus 112. In one embodiment, the entity importance engine 114 produces the rankings by preprocessing information in the corpus 112 to calculate importance scores in advance of receiving queries. Entity importance scores and rankings for new books are calculated as the books are added to the corpus 112 and, therefore, the entity rankings are available at the same time the books are available as potential search results.

An entity identification module 310 analyzes the text of a book to identify entities mentioned therein. The module 310 uses a variety of different natural language processing techniques to analyze the book text depending upon the embodiment. These techniques include labeling entities by hand, using regular expressions or other identification rules, and building statistical models that optimize the contribution of local and/or global features of the book to perform identification. Examples of local features include the words surrounding the putative entity, part-of-speech tags assigned to the words that comprise the potential named entity and surrounding words, the parse structure of the sentence, the compatibility of known features of the named entity, such as gender or plurality, with the rest of the sentence or surrounding sentences and the probability of generating the text under an n-gram language model. Features from the wider context include the overall frequency of the words that comprise a potential named entity, the genre of the book being labeled and the set of entities already identified.

An importance calculation module 312 calculates importance scores for the entities identified by the entity identification module 310. In the embodiment described herein, the importance scores are query-independent, meaning that the scores are not based on search queries, such as queries for books or entities mentioned in the books. Further, an embodiment of the importance calculation module 312 calculates scores for the entities a single book and entity type at a time. That is, the scores indicate the relative importance of entities of the same type mentioned by a single book. For example, the importance scores for locations mentioned in a book describe the importance of the locations relative to other locations, but not to dates or people mentioned in the book.

The importance calculation module 312 uses one or more of a variety of techniques to calculate the importance scores. FIG. 3 illustrates a set of modules within the importance calculation module 312 for performing these techniques. In some embodiments, each module within the importance calculation module 312 calculates a separate importance score for each entity. This score is, for example, a value between 0 and 1, where a '1' indicates maximum importance. In other embodiments, some or all of the modules manipulate a single importance score for each entity. Some embodiments use different and/or additional techniques than the ones described here and shown in the figure.

A book context module 314 evaluates the mentions of an entity within the overall context of the book to calculate the entity's importance. In one embodiment, the book context module 314 assigns greater importance to certain sections within the book, and entities receive elevated importance scores if they are mentioned in those sections. Examples of sections that can influence the importance score of an entity include the front and back covers, book flap, copyright page, table of contents, forward or afterward, index, reference section, chapter heading, chapters, special pages within chapters (such as the first page of the chapter), and atypical pages (e.g., pages that do not contain much text). One embodiment considers entity mentions in certain sections, such as the first page of a chapter (and especially the first page of the first chapter) and the preface as more important than mentions in other sections. Further, one embodiment considers entity mentions in certain other sections, such as the front and back covers, copyright pages, reference section, and atypical pages, as less important than mentions in other sections. Additionally, some embodiments consider entity mentions occurring earlier in the book (but after the table of contents and other introductory material) to be more important than mentions later in the book. The location or type of an entity mention within a page can also influence the importance of the entity. For example, an entity can appear in regular text, in a list or table, within a header or footnote, bolded or italicized, near an image (and therefore likely a caption), etc.

One embodiment of the book context module 314 evaluates mentions in the book to other sections of the same book. A large book may reference some chapters, pages, and/or other sections more than others. In one embodiment, sections that are more frequently referenced by other sections of the book are considered more important. Entities that are mentioned in the more important sections receive elevated importance scores.

In addition, some embodiments of the book context module 314 use book record and classification data to influence importance scores of entities mentioned within the book. Book record data, for example, specify information such as the author, title, subject, and genre. Classification data such as the Dewey decimal or Library of Congress classification also specify similar information. Entities mentioned in the book record and classification data are assigned elevated importance scores in one embodiment. Moreover, the book record and classification data are also used to modify the importance of entities within the book. For example, if the book classification data indicate that the book is related to geography, geographic location entities within the book are given elevated importance scores relative to other types of entities.

A precision module 316 uses entity precision information to influence the importance score of an entity. In one embodiment, the precision module 316 determines the precision with which an entity is specified. Entities specified more precisely are assigned elevated importance. For example, a geographic location entity that is specified using a street address is assigned elevated importance relative to location entity that is specified using only a city and state. Likewise, a geographic location entity specified using a city and state is elevated over a city specified using only its name (e.g., "Paris"). Similarly, a date entity specified using a specific date is assigned elevated importance relative to a date entity specified using only a year.

Further, some embodiments of the precision module 316 use OCR confidence scores to influence the importance of an entity. An entity mentioned by text for which there is low confidence that the text was recognized correctly receives a lower importance score. In addition, one embodiment of the precision module 316 utilizes an OCR confidence threshold to exclude entities from the importance calculation altogether. An entity mentioned by text having a confidence score below the threshold receives a very low importance score that makes it unlikely that the entity will ever be displayed.

A references module 318 uses cross-reference and related types of information to influence the importance score of an entity. The third party references considered by the references module 318 include book reviews, "about the book" information, book citations, scholarly citations, and World-Wide Web references. The text providing the third party references is found, for example, in the corpus 112, elsewhere in the data store 110, and/or elsewhere on the network 120.

The references module 318 identifies third-party references to particular sections of a book, and elevates the importance of more frequently-referenced sections. Moreover, the references module 318 considers recursive references when determining importance. Thus, a section that is mentioned by a reference has increased importance if the reference itself is frequently referenced. Furthermore, some embodiments of the references module 318 elevate the importance of entities based on whether the references mention the entities. For example, if a scholarly article cites a particular chapter of a book, and the article mentions an entity that is also mentioned in the cited chapter, the references module 318 elevates the importance score of the entity. In one embodiment, the third party references considered by the references module 318 have a greater influence on the importance score than the intra-book references considered by the book context module 314. Third-party references are considered less partial and, therefore, are considered better signals of the importance of a section or entity in the book.

A user activities module 320 influences the importance scores of entities in response to user activities involving the entities. The user activities module 320 interacts with the presentation engine 118 and/or other systems on the network 120 to obtain data describing how often sections of books are accessed by users. An embodiment of the user activities module 320 elevates the importance scores of entities mentioned in book pages, chapters, or other sections that are accessed/viewed more often by users.

A term weighting module 322 uses the frequency of entity mentions in a book to influence the importance scores of the entities. In one embodiment, the term weighting module 322 uses term frequency-inverse document frequency (TF-IDF) techniques to evaluate the frequency of mentions. For TF-IDF, the term weighting module 322 analyzes the entire corpus 112 to identify all entities mentioned therein. The term weighting module 322 determines the number of mentions of an entity (optionally normalized by the length of the text) in a book multiplied by the IDF, where the IDF is the log of the total number of books in the corpus 112 divided by the number of books in which the entity appears. For example, one would expect frequent mentions of the location entity "New York" across the corpus because New York City is a leading financial and cultural center. However, the entity New York would show up in the top 100 location entities for a book only if the book contained many more New York mentions than most other books. The term weighting module 322 influences the entities' importance scores by elevating the scores of higher-ranked entities within a book. Other embodiments use other term weighting techniques to influence entity importance scores.

A ranking module 324 ranks entities of books based on the importance scores calculated by the importance calculation module 312. In one embodiment, the ranking module 324 produces a ranking of entities of the same type within a book based on importance. For example, the ranking module 324 ranks the locations mentioned in a book based on importance. Typically, the ranking module 322 ranks the entities in order of decreasing importance.

As mentioned above, in one embodiment each module within the importance calculation module 312 produces a separate importance score for an entity. The ranking module 322 analyzes the importance scores that the modules produced for the entity and calculates the entity's final importance score. The ranking module 322 ranks the entities based on their final importance scores.

Generally, the final importance score is determined by weighting the individual importance scores for an entity generated by the modules within the importance calculation module 312. In one embodiment, the ranking module 324 calculates a weighted sum as a linear combination of the individual importance scores, where the coefficients are the weights applied to the individual scores. For example, for importance scores X, Y, and Z, and weights A, B, and C, the linear combination is:

$$\text{Final Importance Score}=AX+BY+CZ.$$

Further, in one embodiment the final importance score is normalized to a value between 0 and 1 by dividing the result of the linear combination by the sum of the weights. For example, if A=100, B=10, and C=1, the sum of the weights is 111 and the final importance score is normalized by dividing the linear combination by that value. Different embodiments of the ranking module 324 utilize different weightings of the individual importance scores. In one embodiment, the importance scores generated by the book context 314 and entity precision 316 modules receive the highest weights and therefore have the greatest effect upon the rankings of the entities.

Figure 4:
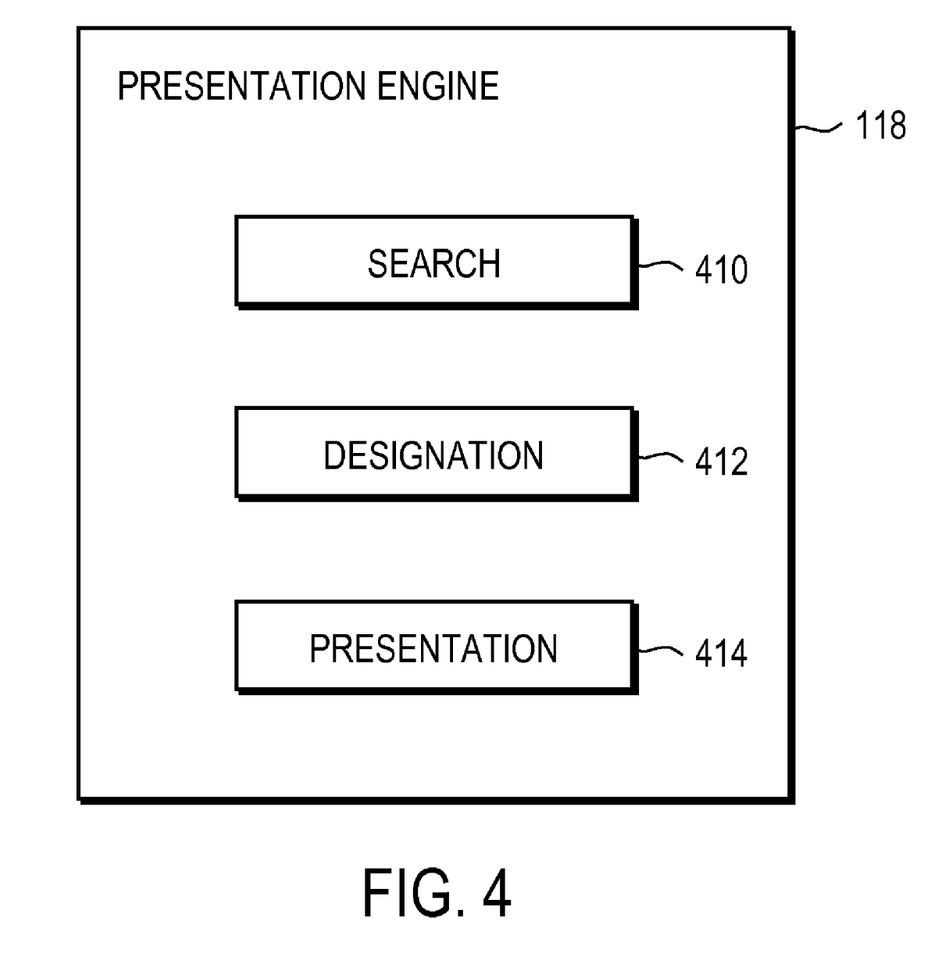
FIG. 4 is a high-level block diagram illustrating modules within the presentation engine according to one embodiment.

FIG. 4 is a high-level block diagram illustrating modules within the presentation engine 118 according to one embodiment. As mentioned above, an embodiment of the presentation engine 118 interacts with the requestor 116 to provide information from the corpus 112. Some embodiments have different and/or additional modules than those shown in FIG. 4. Moreover, the functionalities can be distributed among the modules in a different manner than described here.

In one embodiment, a search module 410 supports searches to identify books, entities, and/or other information in the corpus 112. In one embodiment, the search module 410 receives a search query from the requestor 116, and provides search results that satisfy the query in response. In one embodiment, the requestor 116 provides the search module 410 with an explicit search query that specifies search parameters such as keywords, meta-data describing desired results, and/or other information. In another embodiment, the search query is generated implicitly based on actions performed by the requestor 116 and/or other criteria.

The search results returned in response to the query include references to books that at least partially satisfy the query. In one embodiment, the search results include a ranked list that includes the books' titles, authors, dates of publication, numbers of pages, and cover art. In addition, for some books the search results include brief snippets of text within the book that relate to the search query. For example, the search query "around the world in 80" returns a list of books including Jules Verne's "Around the World in 80 Days," "Around the World in 80 Dates," "Around the World in 80 Bars," and "Around the World in 80 Puzzles."

In one embodiment, the scoring functions utilized by the search module 410 to rank books given a query combine many signals, including both query-independent and query-dependent signals. For example, the importance score, and ranking, of the book can be based on query-independent signals such as its sales volume or current position on a best seller list. In contrast, the score of a book can also be based on the number of terms in the query that match those in the book. Information retrieval techniques such as TF-IDF scoring and synonym expansion may be used in such scoring functions.

An embodiment of the search module 410 uses entity type-specific synonymy to augment these information retrieval techniques. If a query contains a particular type of entity—such as a date, location, or person's name—the search module 410 considers terms that may not literally match the specified entity but which are considered the same or nearly the same when the type of entity is considered. For example, if the query contains "New York" then books that mention "Brooklyn" or "Manhattan" could be considered matches because of knowledge that New York is a place that encompasses both Brooklyn and Manhattan. Similarly, if a query mentions the date May 1972, books that mention dates within the month of May in 1972, such as May 23, 1972, could be considered to match the query. The same sort of entity type-specific synonymy applies to matching person names and names of other types of entities. A query seeking books about "Joe DiMaggio" could score highly in books that do not contain the last name DiMaggio if the books contain nicknames such as "Joltin' Joe" or "The Yankee Clipper."

In addition, an embodiment of the search engine module 410 uses entity importance to influence book search results. For example, "New York" is likely to have a high document frequency in the corpus 112 for the reasons mentioned above. TF-IDF scoring will thus downweight individual matches of "New York." If the frequency of mentions within a single book is particularly high, it will overcome this downweight and increase the likelihood that the book is a good match for the query. However, not all mentions are equal. For example, many publishers have offices in New York and consequently the addresses on copyright pages in books often contain addresses in New York. Such mentions do not figure highly in determining whether a book matches a query for New York. However, mentions of New York in a book's title, in chapter titles or in other sections of prominence within the book or its metadata are given more weight in determining the relevance of a book to a user's query.

The designation module 412 allows books returned as the search results to be designated for further analysis. In one embodiment, the requestor 116 designates a book by selecting it from the search results list (e.g., by clicking on a web page link corresponding to the book). In another embodiment, the requestor 116 designates one or more books from the search results by using user interface (UI) elements to highlight one or more books for subsequent analysis. Assume for purposes of this example that the requestor 116 designates the book "Around the World in 80 Days" by Jules Verne.

A presentation module 414 presents information about a book designated by a requestor 116. The presented information includes a summary of information about the book, such as a cover image and an abstract of its contents. Further, an embodiment of the presentation module 414 determines whether data about entities mentioned in the book are available and of a quality exceeding a predetermined threshold. If entity data are available, the presentation module 414 presents the entities in a style selected to enhance comprehension and utility of the entity type. For example, "Around the World in 80 Days" describes entities including person entities (the fictional characters Phileas Fogg and Passerpartout), dates, and locations. In one embodiment, the presentation module 414 displays a person entity as a list of facts related to the person, displays date entities on a timeline showing the dates, and displays location entities as markers on a map, with the markers corresponding to the locations of the entities. Other embodiments show entities using different presentation styles, such as graphs and charts, multimedia displays, and three-dimensional visualizations.

An embodiment of the presentation module 414 initially presents one or more types of entity information. In some embodiments, the presentation module 414 analyzes the entities mentioned in the designated book and selects the one or more entity types having the most and/or "best" information for the initial presentation. In other embodiments, a book has associated metadata describing the preferred entity type or types. Depending upon the book, entity information and/or embodiment, the requestor 116 can use UI controls to obtain presentations of other types of entities and/or other presentation styles. In one embodiment, the presentation module 414 does not present entity information if there are fewer than a certain number of high-scoring entities. For example, if there are fewer than 25 entities with scores above 0.5 out of a normalized maximum score of 1.0, the presentation module 414 does not present any entities.

Further, if there are many entities with high importance scores, an embodiment of the presentation module 414 limits the number of displayed entities based at least in part on the entity importance rankings. For example, the presentation module 414 shows only a limited number of entities on a map in order to avoid crowding the map and making it difficult to comprehend. The specific number of entities presented at once depends upon the particular embodiment and/or the presentation style. In some embodiment, the presentation module 414 receives the ranked list of entities and selects the entities to present based on the rankings. For example, the presentation module 414 initially selects and presents the 100 highest-ranked entities.

FIG. 5 illustrates a sample web page 500 generated by the presentation module 418 and presenting information about the book "Around the World in 80 Days." The web page 500 is separated into several regions. A title region 510 displays the title and author of the book. A summary region 512 displays summary information for the book including an image of the book cover, classification data such as the author, translator, publisher, genre, and ISBN number, and the number of pages. In addition, the summary region 512 includes a brief abstract describing the book.

A contents region 514 displays references to content within the book. In the illustrated example, the contents region 514 displays the title and page number of the first five chapters in the book. The references are hyperlinks, and a user can view the text of the associated chapter by selecting the link.

An entity presentation region 516 shows the presentation describing the entities mentioned in the book. These entities are selected based on entity importance rankings to limit the number of entities shown at once and thereby increase the comprehension and utility of the presentation. In the sample web page 500, the presentation region 516 shows 25 of the most important location entities mentioned in the book. The region 516 includes a map 518 having 25 markers, such as marker 520, at locations mentioned in the book. A user can select a marker 520 and obtain additional information about the book and/or location. In one embodiment, the presentation module 414 provides a pop-up window (or equivalent UI element) that shows a snippet of text from the book mentioning the location and a link to the page of the book from which the text is drawn.

In some embodiments, the presentation module 414 selects the snippet of text in a manner that facilitates the comprehension and utility of the entity. The presentation module 414 recognizes that some sections of the book are useful for identifying important entities, but are not necessarily useful to a user that is trying to understand the entity. Thus, the presentation module 414 selects a snippet of text from a section of the book that describes characteristics of the entity, and not necessarily from a table of contents, index, or other location that lists the entity but does not describe it.

UI tools 522 allow the user to pan and zoom the map 518. Moreover, an embodiment of the presentation region 516 includes a map key 524 that provides information about the map markers 520. In one embodiment, the key provides information similar to that provided by the pop-up windows. Namely, the name of the location, a snippet of text mentioning the location, and a link to the text in the book. The illustrated embodiment of the map key 524 lists only a subset of the markers/locations on the map although other embodiments can list more or all of them.

Figure 6:
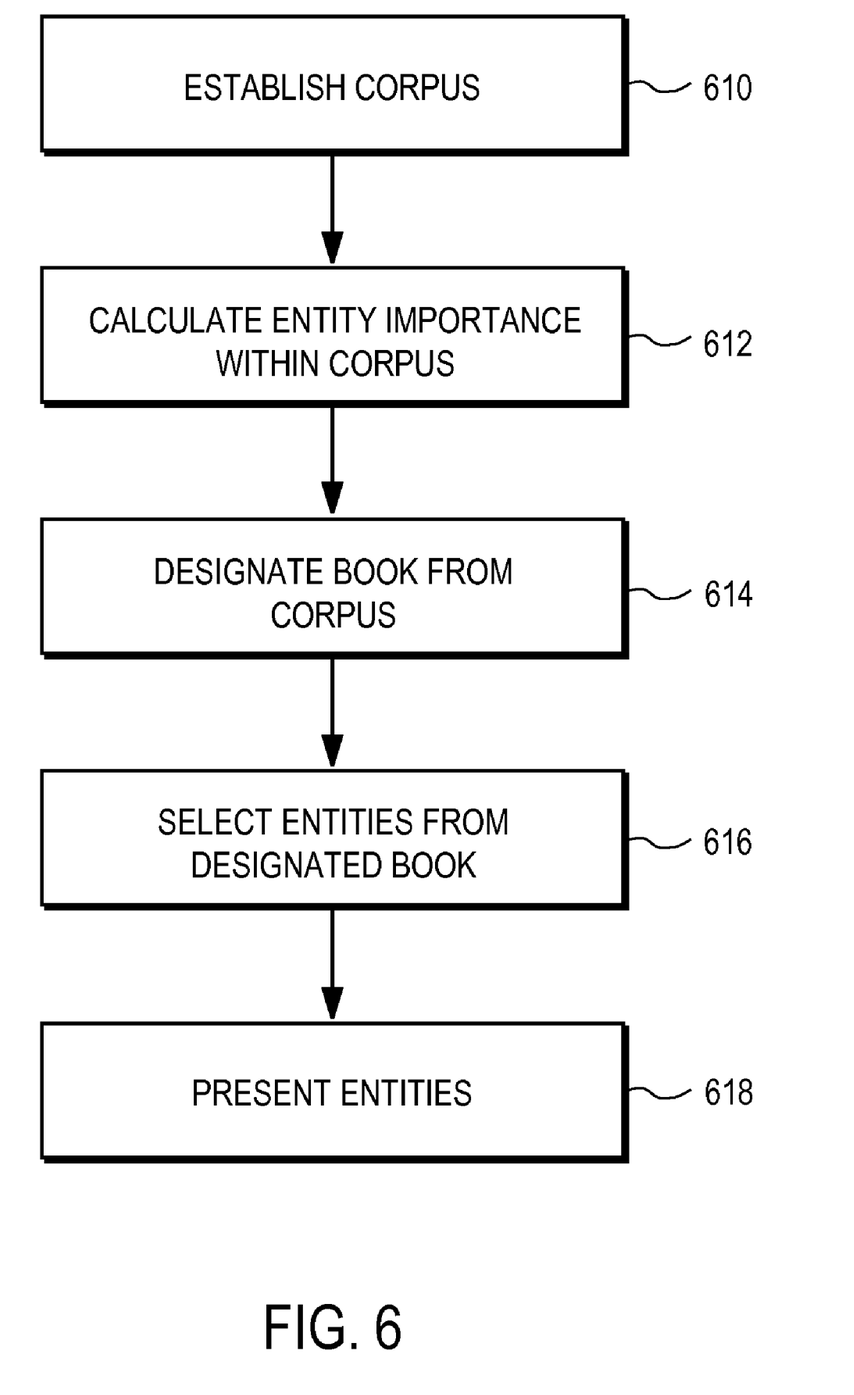
FIG. 6 is a flow chart illustrating steps performed according to one embodiment.

FIG. 6 is a flow chart illustrating steps performed according to one embodiment. Other embodiments perform the steps in different orders and/or perform different or additional steps than the ones shown in FIG. 6.

Initially, a corpus 112 is established 610 in the data store 110. The corpus 112 is established, for example, by scanning paper copies of books and other documents and then applying an OCR process to produce machine-readable text from the scans. The corpus 112 can also be established by receiving books, web pages, and other texts already in machine-readable form. In one embodiment, the corpus 112 includes book texts and associated metadata describing the texts.

The entity importance engine 114 analyzes the information in the corpus to calculate 612 importance scores and rankings for the entities mentioned therein. As described above, the entity importance engine 114 uses a variety of factors to determine the relative importance of an entity. One embodiment of the entity importance engine 114 considers mentions within the overall context of the book to calculate an entity's importance relative to other entities of the same type. Since the importance scores are query-independent, an embodiment of the entity importance engine 114 calculates the scores and rankings asynchronously from receiving the queries. For example, the entity importance engine 114 can preprocess the initial information in the corpus 112 before receipt of any queries.

A requestor 116 interacts with the presentation engine 118 to generate queries searching for books. The presentation engine 118 provides query results identifying a set of books at least partially satisfying the query and the requestor 116 designates 614 one or more of the books for subsequent analysis. The presentation engine 118 presents additional information about the designated book, including information about entities mentioned in the book.

The presentation engine 118 selects 616 the entities of a given type mentioned in the designated book based on the entities' importance rankings. In one embodiment, the presentation engine 118 initially selects 616 and presents only the top ranked entities. The presentation engine 118 presents 618 the entities in a style that enhances comprehension of the entity type and utility of the presentation. For example, the presentation engine 118 presents location entities on a map, presents date entities on a timeline, and presents other entity types using other styles.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A system for presenting entities mentioned in books, comprising:
- a non-transitory computer-readable storage medium storing executable computer program instructions comprising:
  - an entity importance engine for assigning query-independent importance scores to entities of an entity type mentioned by books in a corpus, wherein there are a plurality of entity types, the importance scores assigned to the entities indicate relative importance of entities of a same type mentioned by a book, and an importance score of an entity is based at least in part on a context in which the entity is mentioned in the book;
  - a search module for receiving a search query from a requestor, identifying a list of a plurality of books in the corpus that at least partially satisfy the query, and ranking the books in the list in an order based at least in part on the query-independent importance scores assigned to entities mentioned by the books; and
  - a presentation module for presenting the plurality of books to the requestor in the ranked order; and
- a processor for executing the computer program instructions.

2. The system of claim 1, wherein the entity importance engine further comprises:
- an importance calculation module for calculating the importance scores for the entities, the importance calculation module comprising one or more modules from the set consisting of:
  - a book context module for evaluating the context in which the entity is mentioned by the book and calculating the importance score responsive at least in part to the context;
  - a precision module for determining a precision at which the entity is mentioned in the book and calculating the importance score responsive at least in part to the precision;
  - a references module for identifying third party references to sections of the book in which the entities are mentioned and calculating the importance score responsive at least in part to the third party references;
  - a user activities module for identifying one or more sections of the book in which entities are mentioned that are accessed more frequently than other sections and calculating the importance score responsive at least in part to a frequency of access; and
  - a term weighting module for determining frequencies that entities are mentioned in the corpus, determining a frequency of which the entity is mentioned in the book relative to a frequency that the entity is mentioned in other books in the corpus and calculating the importance score responsive at least in part to the frequency of mentions.

3. The system of claim 1, wherein the entity importance engine further comprises:
- a ranking module for calculating final importance scores as weighted sums of individual importance scores assigned to the entities and ranking the entities in order of importance responsive to the entities' final importance scores.

4. The system of claim 1, wherein the presentation module presents entities of a single type in a particular style selected based at least in part on the entity type.

5. The system of claim 4, wherein an entity type is a geographic location, and wherein the presentation module presents geographic location entities on a map.

6. The system of claim 4, wherein an entity type is a date, and wherein the presentation module presents date entities on a timeline.

7. A computer program product stored on a non-transitory computer-readable storage medium having executable computer program instructions for presenting entities mentioned in books, comprising:
- an entity importance engine for assigning query-independent importance scores to entities of an entity type mentioned by books in a corpus, wherein an entity comprises a thing described by information in a book, and an importance score of the entity is based at least in part on a context in which the entity is mentioned in the book;
- a search module for receiving a search query from a requestor, identifying a list of a plurality of books in the corpus that at least partially satisfy the query, and ranking the books in the list in an order based at least in part on the query-independent importance scores assigned to entities mentioned by the books; and
- a presentation module for presenting the plurality of books to the requestor in the ranked order.

8. The computer program product of claim 7, wherein there are a plurality of entity types, and wherein the importance scores assigned to the entities indicate relative importance of entities of a same type.

9. The computer program product of claim 7, wherein the entity importance engine further comprises:
- an importance calculation module for calculating the importance scores for the entities, the importance calculation module comprising one or more modules from the set consisting of:
  - a book context module for evaluating the context in which the entity is mentioned by the book and calculating the importance score responsive at least in part to the context;
  - a precision module for determining a precision at which the entity is mentioned in the book and calculating the importance score responsive at least in part to the precision;
  - a references module for identifying third party references to sections of the book in which the entities are mentioned and calculating the importance score responsive at least in part to the third party references;
  - a user activities module for identifying one or more sections of the book in which entities are mentioned that are accessed more frequently than other sections and calculating the importance score responsive at least in part to a frequency of access; and
  - a term weighting module for determining frequencies that entities are mentioned in the corpus, determining a frequency of which the entity is mentioned in the book relative to a frequency that the entity is mentioned in other books in the corpus and calculating the importance score responsive at least in part to the frequency of mentions.

10. The computer program product of claim 7, wherein the entity importance engine comprises:
- a ranking module for calculating final importance scores as weighted sums of individual importance scores assigned to the entities and ranking the entities in order of importance responsive to the entities' final importance scores.

11. The computer program product of claim 7, wherein there are a plurality of entity types, and wherein the presentation module presents entities of a single type in a particular style selected based at least in part on the entity type.

12. The computer program product of claim 11, wherein an entity type is a geographic location, and wherein the presentation module presents geographic location entities on a map.

13. The computer program product of claim 11, wherein an entity type is a date, and wherein the presentation module presents date entities on a timeline.

14. A computer-implemented method for presenting entities mentioned in books, comprising:
assigning query-independent importance scores to entities of an entity type mentioned by books in a corpus, wherein an entity comprises a thing described by information in a book, there are a plurality of entity types, the importance scores assigned to the entities indicate relative importance of entities of a same type mention by the book, and wherein an importance score of the entity is based at least in part on a context in which the entity is mentioned in the book;
receiving a search query from a requestor;
identifying a list of a plurality of books in the corpus that at least partially satisfy the query;
ranking the books in the list in an order based at least in part on the query-independent importance scores assigned to entities mentioned by the books; and
presenting the plurality of books to the requestor in the ranked order.

15. The method of claim 14, wherein assigning query-independent importance scores further comprises:
calculating the importance scores for the entities, wherein calculating the importance scores comprises one or more from the set consisting of:
evaluating the context in which the entity is mentioned by the book and calculating the importance score responsive at least in part to the context;
determining a precision at which the entity is mentioned in the book and calculating the importance score responsive at least in part to the precision;
identifying third party references to sections of the book in which the entities are mentioned and calculating the importance score responsive at least in part to the third party references;
identifying one or more sections of the book in which entities are mentioned that are accessed more frequently than other sections and calculating the importance score responsive at least in part to a frequency of access; and
determining frequencies that entities are mentioned in the corpus, determining a frequency of which the entity is mentioned in the book relative to a frequency that the entity is mentioned in other books in the corpus and calculating the importance score responsive at least in part to the frequency of mentions.

16. The method of claim 14, wherein assigning query-independent importance scores further comprises:
calculating final importance scores as weighted sums of individual importance scores assigned to the entities and ranking the entities in order of importance responsive to the entities' final importance scores.

17. The method of claim 14, wherein presenting the plurality of books further comprises presenting entities of a single type in a particular style selected based at least in part on the entity type.

18. The method of claim 17, wherein an entity type is a geographic location, and wherein presenting entities of a single type in a particular style selected based at least in part on the entity type further comprises presenting geographic location entities on a map.

19. The method of claim 17, wherein an entity type is a date, and wherein presenting entities of a single type in a particular style selected based at least in part on the entity type further comprises presenting date entities on a timeline.

* * * * *